United States Patent Office 3,117,047
Patented Jan. 7, 1964

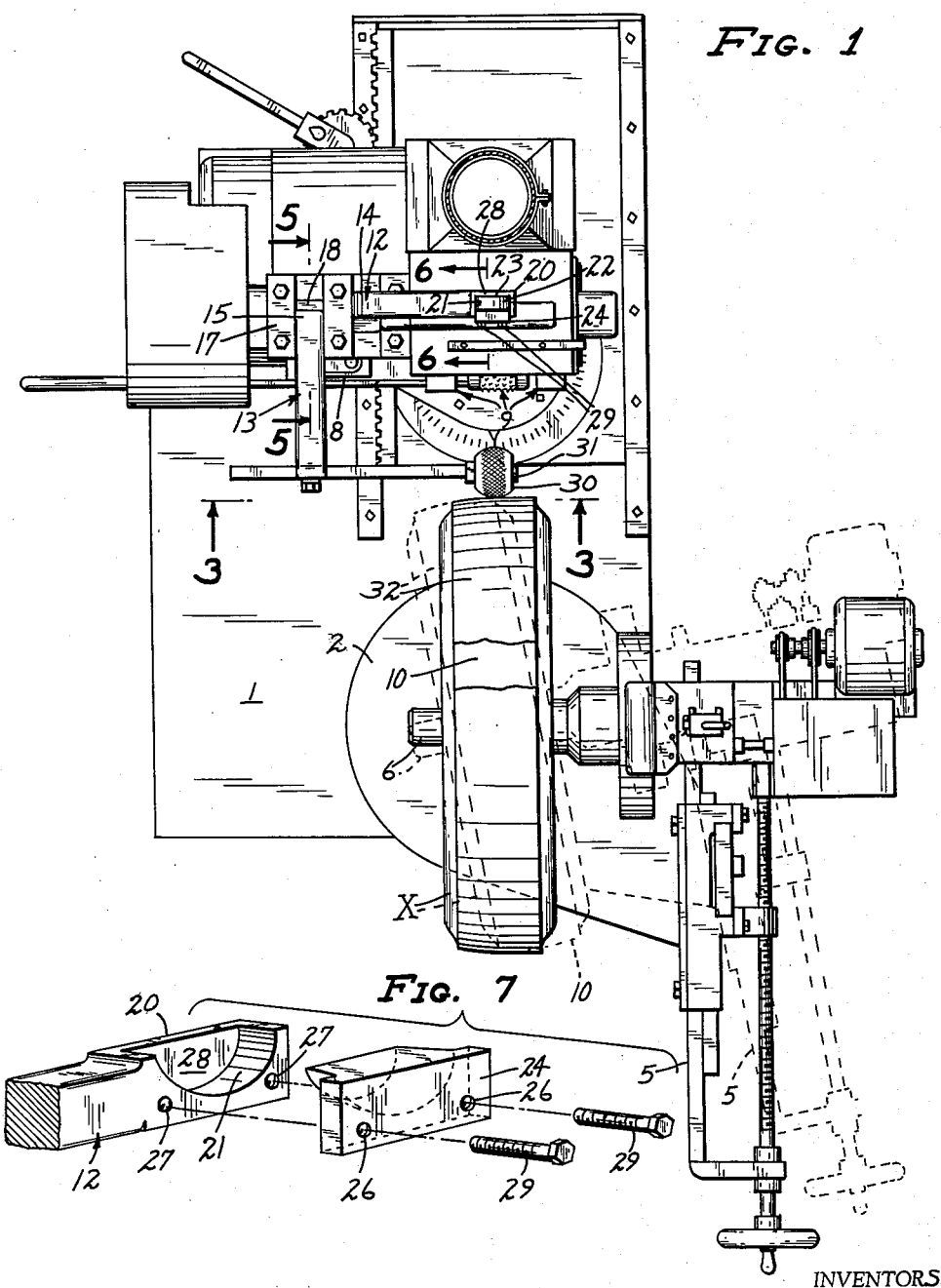

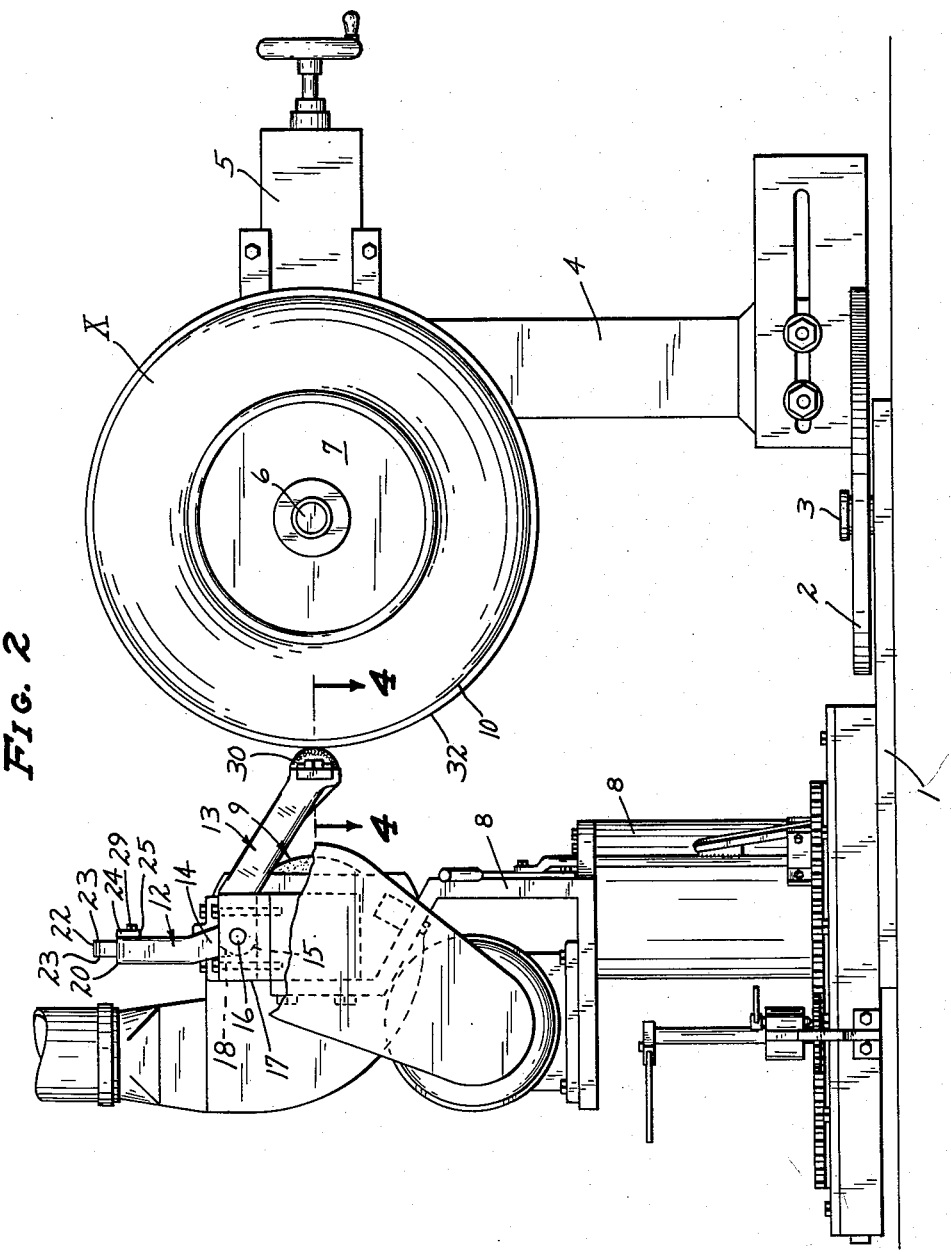

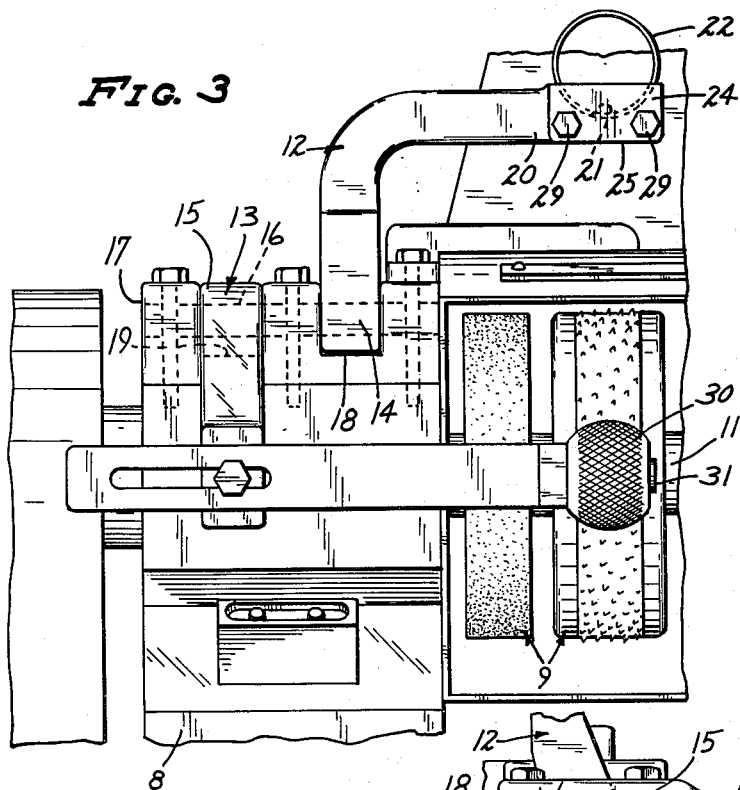
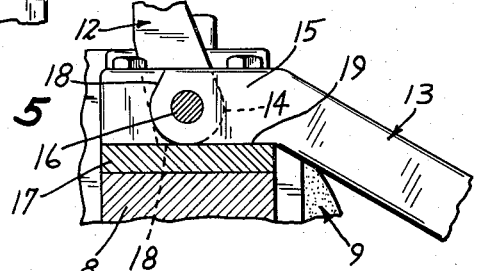
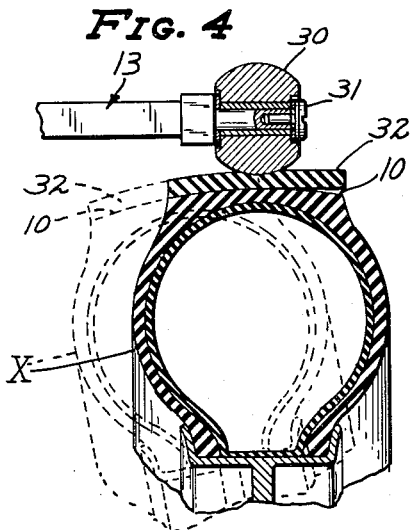
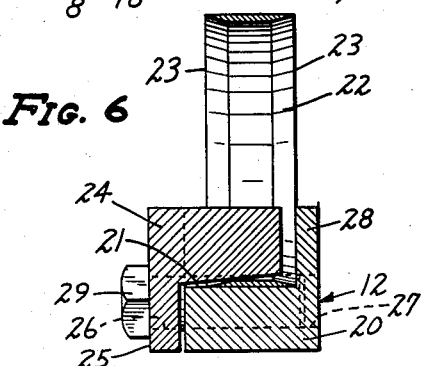

3,117,047
TIRE BUFFING AND TRUING MACHINE
Eugene J. Capistrant and Rudolph E. Olson, Minneapolis, Minn., assignors to Paul E. Hawkinson Company, Minneapolis, Minn., a corporation of Minnesota
Filed Jan. 18, 1962, Ser. No. 167,100
3 Claims. (Cl. 156—410)

Our invention relates to improvements in tire treading, removing and truing devices and is in the nature of an improvement upon and/or modification of the structure disclosed in United States Patent No. 2,645,147. More specifically, our invention relates to accessories for the precision tire tread removing and truing devices disclosed in said patent.

Still more specifically, our invention relates to novel tool accessories for use in the preparing of a pneumatic tire casing for recapping or retreading and has for its primary object the provision of a novel knife which may be used to speedily cut away the undesired portions of old tread remaining on the carcass prior to the buffing operation, as well as a novel stitching ball for use in causing adherence between the new raw tread stock and the underlying buffed and cemented peripheral surface of the tire casing.

Still more specifically, our invention relates to tools of the type above described which may be readily moved into and out of operative positions with a minimum of effort and skill.

A still further object of our invention is the provision of devices of the class above described which are relatively inexpensive to produce, which are highly efficient in their operation and which are rugged and durable.

The above and still further objects of our invention will become apparent from the following detailed specification, appended claims and attached drawings.

Referring to the drawings wherein like characters indicate like parts throughout the several views.

FIG. 1 is a view in top plan of a tire tread removing and truing device illustrating our novel invention, some parts being broken away and some parts shown in section;

FIG. 2 is a view in side elevation of the structure of FIG. 1;

FIG. 3 is a fragmentary view in front elevation as seen from the line 3—3 of FIG. 1;

FIG. 4 is a fragmentary view in section as seen substantially from the line 4—4 of FIG. 2, on an enlarged scale;

FIG. 5 is a fragmentary sectional view as seen from the line 5—5 of FIG. 1;

FIG. 6 is an enlarged fragmentary sectional view taken on the line 6—6 of FIG. 1; and FIG. 7 is an exploded view in perspective of the structure shown in FIG. 1, on an enlarged scale.

Referring with greater particularity to the drawings, the numeral 1 indicates a base member to which a turntable 2 is secured for rotation about the vertical axis indicated at 3. Rigidly secured to the turntable 2 in offset relationship to the pivotal connection 3 is a standard 4. Mounted and guided for sliding movements in a horizontal plane on the upper end of the standard 4 is a slide member 5. Operatively carried by the slide member 5 is a rotary shaft 6 which projects laterally outwardly at right angles to the direction of movement of the slide 5. Mounted for rotation about a horizontal axis on the free end of the shaft 6 is a rim 7 for demountably receiving a pneumatic tire X to be buffed and treated. The rim 7, the means for imparting movements to the slide 5, and means for imparting rotation to the shaft 6 and rim 7 carried thereby, are described in detail in the above-identified patent and will not here be described in detail, particularly as they form no part of the instant invention.

Mounted on the base 1 for sliding movements toward and away from the pivot axis 3 is a second standard 8 upon which is mounted for rotation on a horizontal axis one or more tire tread buffing wheels, identified collectively by the numeral 9. It will be noted that the peripheral surface of the buffing wheel is so disposed as to engage the peripheral surface 10 of the pneumatic tire X upon slidable manipulation of the second standard 8 on the base 1 as well as slidable adjustments of the slide 5 with respect to the standard 4. Here again this mechanism forms no part of the instant invention and is described in detail in the above-identified patent. It will be noted that engagement of a given one of the buffing wheels 9 with the peripheral surface 10 of the tire casing X is substantially on a horizontal plane intersecting the axis of the shaft 6.

Mounted for swinging movements on a common horizontal axis parallel to the axis 11 of the buffing wheels 9 is a pair of L-shaped mounting arms 12, 13, the inner ends 14, 15 respectively of which are displaced axially with respect to the buffing wheels 9, see particularly FIG. 3. It will be noted that the arms 12, 13 are mounted for swinging movements between operative positions forwardly of the buffing wheels 9, and inoperative positions generally upwardly and rearwardly spaced from said operative positions, FIG. 1 showing the arm 13 in operative position and the arm 12 in its inoperative position.

By reference particularly to FIGS. 3 and 5, it will be seen that the inner ends 14 and 15 of the arms 12, 13 respectively, are journalled on a shaft 16 that is mounted in a bearing bracket 17 bolted or otherwise rigidly secured to the second standard 8. Said inner ends 14 and 15 are provided with flat surface portions 18 that engage adjacent portions of the bearing bracket 17 to limit swinging movement of the arms 12 and 13 toward their inoperative positions. Adjacent their inner ends 14 and 15, the arms 12 and 13 are adapted to engage adjacent portions of the bracket 17, as indicated at 19 in FIG. 5, to limit movement of said arms 12 and 13 toward their operative positions.

Referring particularly to FIGS. 6 and 7, it will be noted that the free end of the arm 12 is formed to provide a head 20. Head 20 in turn defines an arcuate seat-forming recess 21 for the reception of a cylindrical tire tread-cutting knife 22. As shown, the knife 22 is preferably sharpened on its opposite edges to provide cutting surfaces 23. Removably, adjustably securing the knife 22 within the recess 21 is an arcuate, tapered segmental clamping block 24. The clamping block 24 has an angularly disposed flange 25 which is provided with apertures 26 which are alignable with apertures 27 in one side of the head 20. With this structure, see particularly FIG. 6, the clamping block 24 forces the cylindrical knife 22 against the seat 21 and against the shoulder-forming back wall 28 when threaded clamping bolts 29 are inserted through the aligned apertures 26, 27. It should be obvious that as one circumferential portion of one of the cutting edges 23 becomes dull the knife 22 can be rotated partially by merely loosening of the bolts 29 and thereafter retightening same. On the other hand, when it is desired to reverse the knife 22 so as to utilize the opposite sharpened edge 23 thereof this may be done only by removing of the clamping block 24 and thereafter replacing same. It might here be stated that the cutting knife 22 is very effective in quickly removing the excess tread remaining on a worn tire carcass, immediately prior to subjecting the peripheral surface to the precision buffing effected by the buffing wheel 9.

As shown particularly in FIGS. 1 and 4, the arm 13 has mounted on its free end a rotary tread-engaging stitching ball 30 which is journalled thereto for rotation on a horizontal axis by means of a removable clamping bolt 31. Stitching ball 30 being substantially spherical in shape it has been found to be extremely effective in the stitching of uncured tread stock 32 to the buffed peripheral surface 10 of the tire casing X after application of vulcanizing cement thereto.

Our invention has been thoroughly tested and found to be completely satisfactory for the accomplishment of the above objects and while we have shown and described a preferred embodiment, we wish it to be specifically understood that the same is capable of modification without departure from the spirit and scope of the appended claims.

What we claim is:

1. In a device of the class described,
   (a) a horizontal base member,
   (b) a standard mounted on said base member for rotation,
   (c) a slide member supported by said standard for movements in a horizontal plane,
   (d) means carried by said slide for mounting a pneumatic tire casing for rotation on a horizontal axis and for swinging movements about the axis of rotation of said standard,
   (e) a second standard on said base member in laterally spaced relation to said first-mentioned standard,
   (f) a power-operated buffing wheel on said second-mentioned standard and engageable with the peripheral surface of said tire upon movements of said slide,
   (g) a pair of arms carried by said second standard and mounted thereon for swinging movements about horizontal axes between operative positions forwardly of said buffing wheel and inoperative positions generally rearwardly spaced from said operative positions,
   (h) an arcuate tread-cutting knife,
   (i) means removably mounting said knife on the outer end of one of said arms,
   (j) a rotary tread-engaging stitching ball journalled on the outer end of the other of said arms on a horizontal axis,
   (k) and stop means limiting movements of each of said arms in opposite directions, said mounting arms being L-shaped and journalled on said second standard on a common axis parallel to the axis of said buffing wheel, the inner ends of said arms being displaced axially with respect to said buffing wheel.

2. The structure defined in claim 1 in which said cutting knife is cylindrical in form, said knife mounting means comprising a head on the outer end of said one of the arms, said head defining an arcuate knife-receiving recess and a shoulder-forming back wall, an arcuate tapered segmental clamping block, and means removably locking said clamping block in said arcuate recess to force said knife against said seat and said shoulder-forming back wall.

3. The structure defined in claim 2 in which opposite ends of said cutting knife are sharpened to provide circular cutting edges.

References Cited in the file of this patent

UNITED STATES PATENTS

| 2,645,147 | Hawkinson | July 14, 1953 |
| 2,734,553 | Rawls | Feb. 14, 1956 |
| 2,774,409 | Skidmore | Dec. 18, 1956 |
| 2,794,503 | Kraft | June 4, 1957 |
| 2,805,699 | Reading | Sept. 10, 1957 |
| 3,002,549 | Boussu et al. | Oct. 3, 1961 |
| 3,003,545 | Peacock | Oct. 10, 1961 |
| 3,030,261 | Roesch | Apr. 17, 1962 |
| 3,081,817 | Hemmeter | Mar. 19, 1963 |